Oct. 23, 1951     F. KURZ     2,572,632
SYNCHRONOUS MOTOR
Filed Jan. 26, 1948     2 SHEETS—SHEET 1
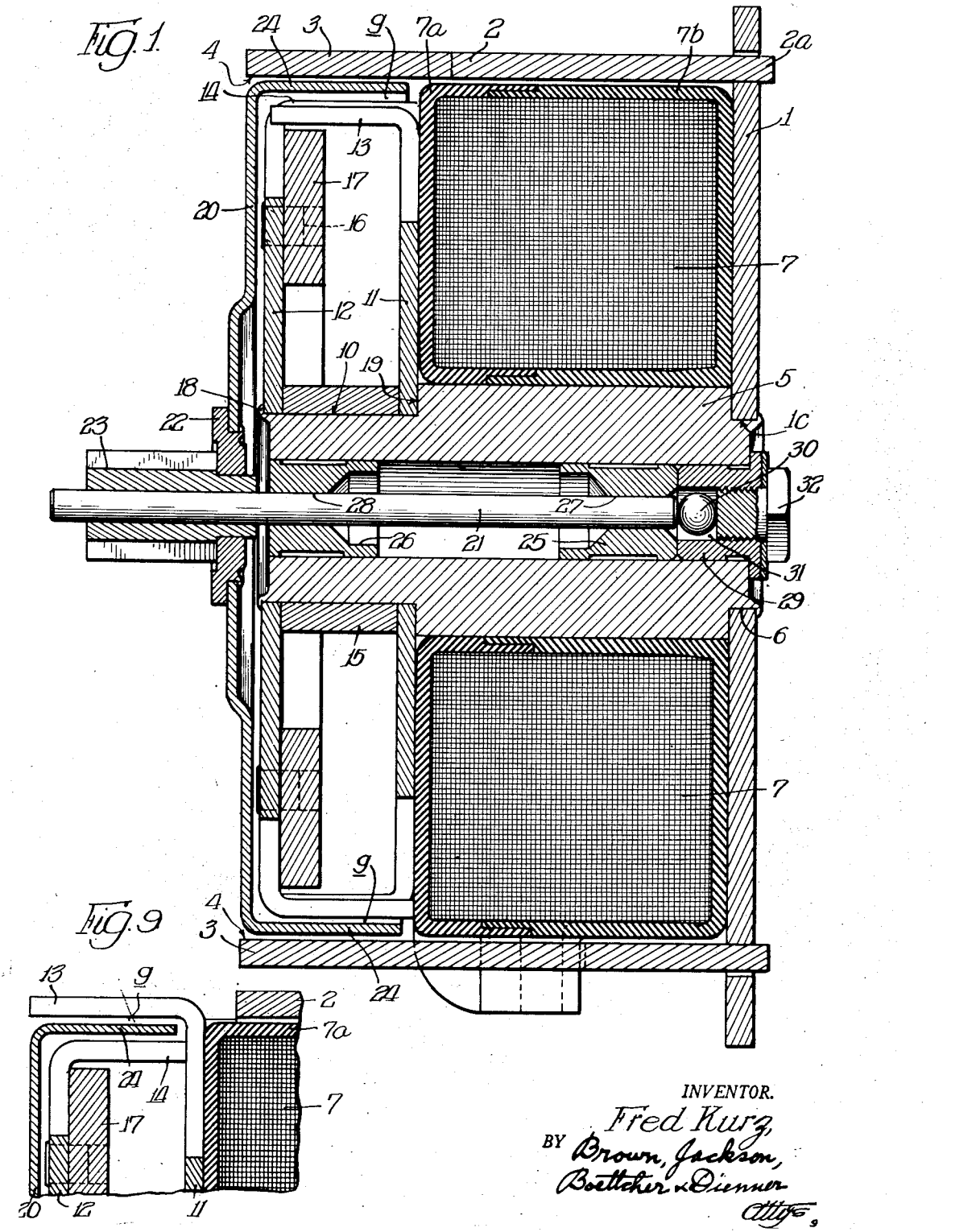
INVENTOR.
Fred Kurz,
BY Brown, Jackson,
Boettcher & Dienner Oct. 23, 1951. F. KURZ 2,572,632
SYNCHRONOUS MOTOR
Filed Jan. 26, 1948 2 SHEETS—SHEET 2
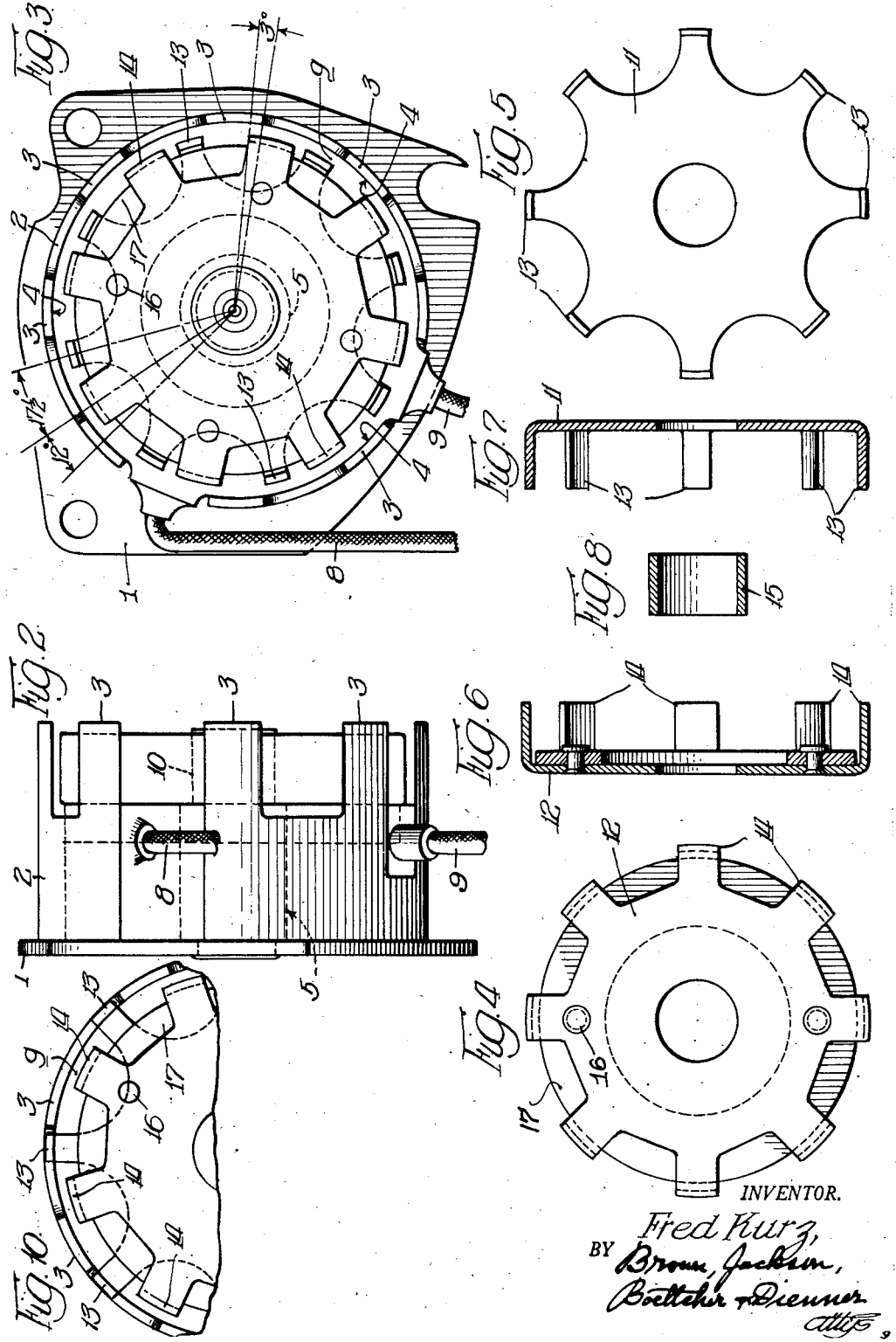
INVENTOR.
Fred Kurz,
BY Brown, Jackson,
Boettcher & Dienner
Attys Patented Oct. 23, 1951

2,572,632

UNITED STATES PATENT OFFICE 2,572,632

SYNCHRONOUS MOTOR

Fred Kurz, Springfield, Ill., assignor to Sangamo Electric Co., Springfield, Ill., a corporation of Illinois Application January 26, 1948, Serial No. 4,401

25 Claims. (Cl. 172—278)

The present invention relates to electric motors, and more particularly to self-starting synchronous motors for use on single phase alternating current. In the illustrated embodiments. I have shown my invention constructed in the form of a small size motor, such as would have particular utility for operating electric clocks, demand registers, time switches, etc., although I wish it to be understood that the invention is also capable of practical embodiment in larger size motors.

One of the principal objects of the invention is to obtain a higher starting torque and a higher running torque in motors of this type.

In this regard, another object of the invention is to provide a self-starting synchronous motor wherein the stator is characterized by spaced inner and outer rings of stator pole pieces defining a cylindrical air gap therebetween, and wherein the rotor is characterized by a cylindrical cup formation revolving within this cylindrical air gap, and composed of a material such as hardened steel having a high hysteresis coefficient and of such electrical conductivity as to provide a high starting torque which increases as the motor approaches synchronous speed.

In this regard, still another object of the invention is to provide a stator structure which, acting on a hysteresis rotor, produces an improved performance in respect to starting and pull-out torque.

A further object of the invention is to obtain a relatively high operating efficiency in small self-starting synchronous motors of this type.

A still further object of the invention is to obtain a compact, sturdy construction of low manufacturing cost and high dependability of performance.

Other objects, features and advantages will appear from the following detailed description of two preferred embodiments of my invention. In the accompanying drawings illustrating these embodiments:

Figure 1 is an axial cross-sectional view of the complete motor on an enlarged scale;

Figure 2 is a side elevational view of the stator structure alone;

Figure 3 is a front end elevational view of the stator structure alone;

Figure 4 is a front end elevational view of one of the two front stator cups which are disposed at the front or rotor end of the stator structure, this figure illustrating the front stator cup which carries the shading ring.

Figure 5 is a front end elevational view of the other front stator cup disposed at the front or rotor end of the stator structure and cooperating with the shaded front stator cup;

Figures 6 and 7 are axial sectional views of these two front stator cups shown in Figures 4 and 5, the two cups being shown with their polar extremities pointing or facing toward each other, somewhat similarly to the positions assumed by these cups in the stator assembly;

Figure 8 is an axial sectional view through the magnetic spacing ring or sleeve which spaces the web portions of these two front stator cups in their assembly on the core of the stator structure;

Figure 9 is a fragmentary axial sectional view showing a modified arrangement of the stator cups; and Figure 10 is a fragmentary front elevational view showing the relation of the stator poles in this modified arrangement.

In the above drawings I have illustrated my invention embodied in a sixteen pole motor which runs synchronously at 450 R. P. M. on a 60 cycle supply circuit, or at other speeds in proportion to the frequency. Referring particularly to Figure 1, the outer portion of the stator or field structure comprises a rear plate 1 of soft iron to which is riveted an outer stator ring 2 of similar material. The stator ring 2 is shown as being secured to the rear plate 1 by providing the stator ring with angularly spaced tongues 2a at the rear end of the ring which are set into similarly shaped openings in the rear plate 1 and are staked or riveted therein. However, the stator ring can be secured to the rear plate in any other suitable manner. The ring 1 thus attached to the plate creates in effect a cup-shaped outer stator element, and, if desired, this outer stator element can in fact be constructed as a one piece cup-shaped member. Referring now to the front end of this stator ring or cup 2, at which front end is defined the cylindrical air gap in which revolves the rotor, this front end of the ring is provided with a series of eight equally spaced pole pieces or projections 3, which define a ring of eight outer stator poles circumscribing the outer side of the annular air gap. The inner faces 4 of these pole pieces define the outer limits of this cylindrical air gap or space within which the active portion of the rotor revolves.

Referring now to the inner stator assembly, this comprises a core 5 preferably composed of silicon iron and provided with a neck 6 which is inserted into the opening 1c of the rear plate 1, and is then riveted over on the back side of this rear plate to form a rigid assembly between the plate and core. Preferably before riveting the core 5 to the rear plate 1, a suitable magnetizing coil 7 is assembled over the core. This coil is preferably encased in an insulating shell comprising two halves 7a and 7b in the form of channel shaped rings having overlapping push joints at their meeting edges. The energizing coil 7 is provided with suitable insulated leads 8 and 9 which are shown as extending from the side of the outer stator shell 2. (See Figure 2.)

The forward end of the magnetic core 5 is provided with a reduced neck 10 on which are mounted the front or inner stator cups or pole pieces illustrated in Figures 4, 5, 6 and 7. These front or inner stator cups comprise two radially extending discs 11 and 12, each provided with eight sets of teeth 13 and 14, respectively, which are bent laterally from the web portions of the discs to define outer cylindrical surfaces, as clearly shown in Figures 4 and 5. The innermost front cup 11 has its eight salient pole teeth extending in a forward direction, as shown in Figure 7, whereas the outermost front cup 12 has its eight salient pole teeth 14 extending rearwardly, as shown in Figure 6. As shown in Figure 3, when these two front cup discs 11 and 12 are assembled in their proper relation in the stator structure the teeth 13 of the rear cup fall in alternating sequence between the teeth 14 of the front cup. These pole teeth 13 and 14 occurring in alternating sequence have approximately the same radius and constitute an inner ring of stator teeth defining the inner circular edge of the air gap g in which revolves the cup-shaped rotor.

Referring again to Figure 1, the web portions of the two front stator cups 11 and 12 are separated a substantial distance by a spacing ring 15, which is preferably made by rolling up a strip of silicon steel or soft iron of the proper size to fit over the reduced neck 10 of the magnetic core 5. This magnetic spacing ring 15 is shown diagrammatically in its spacing relation in Figure 8. The flux which traverses the outermost front cup 12 and its pole pieces 14 is caused to lag that of the innermost front cup 11 and its pole pieces 13. This is preferably accomplished by a copper lag or shading ring 17 which is secured to the outermost front cup 12 by means of rivets 16. In order to make the lagging flux in the outermost cup 12 substantially equal to that in the inner front cup 11, I have made the pole tips 14 of the cup 12 wider than the pole tips 13 of the cup 11, and have also made the radius of the cylindrical surface which defines the outer faces of the pole tips 14 of greater length than that of the pole tips 13. The complete assembly comprising stator cups 11, 12 and spacer ring 15 is secured to the magnetic core 5 by riveting the outer end 18 of the core against the stator cup 12, with the inner portion of this assembly resting against the shoulder 19.

The rotor comprises a cup-shaped member 20 of hardened steel mounted on a steel bearing shaft 21 by means of a suitable hub 22. Secured to the hub and to the shaft is the pinion 23 which engages the usual gearing of the mechanism to be driven. The cylindrical portion 24 of the rotor cup 20 comprises the element of the rotor which is acted upon by the magnetic field of the stator. This cylindrical portion 24 extends back into the cylindrical gap g defined between the outer ring of stator poles 3 and the inner ring of stator poles 13 and 14.

The stator core 5 is provided with a central bore in which are mounted the bearings 25 and 26 provided with aligned bearing openings 27 and 28 for rotatably supporting the shaft 21. An internally threaded bushing 29 is pressed into the rear end of this bore and receives a steel ball 30 which is held within the space 31 by means of a cap screw 32. The purpose of this ball and cap screw is to receive the thrust of the rotor shaft caused by the magnetic field of the stator acting upon the rotor. The diameter of the cylindrical portion 24 of the rotor 20 is such as to just center within the cylindrical gap g between the poles 3 and 13—14. As much as possible of the active cross section of the cylindrical portion 24 is permitted to enter this gap without having the radial portion of the rotor come in contact with the front face of the stator pole cup 12.

My improved motor is the result of lengthy research and experimental work. This work has indicated that certain proportions, angular relations and dimensions give optimum or preferred results, at least under certain operating conditions. I shall now set forth these preferred proportions, angular relations, etc., but I wish it to be understood that such are not to be construed as limitative of the invention, but only for the purpose of aiding those skilled in the art in the quick and easy building of one embodiment of my invention. As pointed out above, the radius of the cylindrical surface which defines the outer faces of the pole tips 14 is slightly larger than the radius which defines the outer faces of the pole tips 13. In one specific embodiment now being described, the radius of the outer faces of the pole tips 14 is 0.780″, whereas the radius of the outer faces of the companion pole tips 13 is 0.775″. Also, as remarked above, the pole tips 14 are preferably made wider than the pole tips 13; in this illustrated embodiment the pole tips 14 have a width 0.2″, whereas the pole tips 13 have a width 0.13″. In the illustrated embodiment wherein the stator has eight pairs of poles, the preferred angular spacing from the center of each pole tip 13 to the center of the associated shaded pole tip 14 is approximately 17½°, and a preferred angular spacing between the center of each pole tip 14 of the inner ring of poles and the center of the adjacent pole tip 3 of the outer ring of poles is approximately 12°, all as illustrated in Figure 3. I have also found in these stators having eight pairs of poles that the best results are obtained when the pole teeth 14 of the inner ring of teeth overlap the pole teeth 3 of the outer ring of teeth by approximately 3°, as indicated in Figure 3. This angle may vary slightly with change in pole tip design, such as in width and in air gap dimension, but this overlap angle is quite important from the point of view of getting the best output. In other embodiments, for stators having P pole pairs, the preferred angular spacing from the center of each pole tip 13 to the center of the associated shaded pole tip 14 is approximately $$\frac{136}{P}$$

degrees, and a preferred angular spacing between the center of each pole tip 14 of the inner ring of poles and the center of the adjacent pole tip 3 of the outer ring of poles is approximately $$\frac{96}{P}$$

degrees. Also, in accordance with my findings on the stator with eight pairs of poles, I prefer for best results with stators of P pairs of poles to have the pole teeth 14 of the inner ring of teeth overlap the pole teeth 3 of the outer ring of teeth by approximately $$\frac{24}{P}$$

degrees. The direction of rotation of the rotor is determined by the relative position of the front pole cups 11 and 12, and is always in the direction as seen from pole tip 13 to its associated pole tip 14, since the flux in the latter lags behind that in the former. The direction of rotation may therefore be changed by interchanging the position of these poles, but in so doing it is necessary to preserve the relative angular spacing substantially as outlined above.

As viewed in Figure 3, it will be seen that the inner surfaces 4 of the outer pole tips 3, in combination with the outer surfaces of the inner pole tips 13 and 14, define two cylindrical air gaps $g$ within which the rotor turns. The magnetic fluxes in outer pole tips 3 and inner pole tips 13 are momentarily of opposite polarity, and that of the other inner pole tips 14 lags by something over 60° in phase with respect to that of pole tips 13. It is desirable to increase this angle as much as possible but to do so generally results in excessive losses, or an unequality between fluxes tending actually to decrease torque. In such arrangement, the flux in the outer teeth or pole tips 3 is equal and opposite the vector sum of the fluxes in the inner teeth or pole tips 13 and 14. In accordance with theory, such combination gives rise to a revolving field component which acts upon the rotor to produce torque in a well known manner. Placing pole pieces of relatively opposite polarity upon opposite sides of the rotor cup flange 24 appears to improve the output of the motor. In order to obtain optimum characteristics, the thickness of the material from which the rotor is made must be such as to provide a relatively high flux density in the material; consequently, in motors of this type the thickness is generally less than .02" and in the present construction I use a thickness of approximately .015".

Another matter of appreciable importance is the use of the magnetic spacer 15 between the web portions of the front stator cups 11 and 12, or the establishment of this spaced relation between the web portions substantially as illustrated. As previously described, this spacer 15 should be of magnetic material such as to span the space between the radially extending web portions of the front stator cups 11 and 12. For example, it would be possible to change the shape of the web portion of cup 11 so that its flattened side would lie against the shading ring 17, which might leave more room for the coil 7. This was actually done but I found that the starting and running torques were greatly reduced regardless of how I altered other factors. I ascribe this to the presence of leakage flux between the cups 11 and 12, hence the advantage of keeping them well separated by the magnetic spacer 15. This also allows room for additional windings, or in the case of low frequencies, additional lag plates 17. It appears, therefore, that for optimum results the cup members 11 and 12 should be spaced apart a distance substantially equal to the length of the polar projections 13 and 14.

In Figures 9 and 10 I have illustrated a modified embodiment of my invention wherein the pole teeth or pole tips 13 on the stator cup 11 extend outwardly beyond the rotor cup 24 and project forwardly in the spaces between the pole tips 3 of the outer ring. In such construction, the inner faces of the pole tips 13 define a cylindrical surface which is substantially coincident with the cylindrical surface defined by the inner surfaces 4 of the outer pole tips 3. The overall characteristics of the motor are not altered by such change of position.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a self-starting single phase synchronous motor, the combination of a core, a winding mounted thereon, an outer stator ring mounted on the rear end of said core, inner and outer front stator disks mounted on the front end of said core, an outer circular ring of pole teeth projecting from said outer stator ring, an inner circular ring of pole teeth projecting alternately from said inner and outer stator disks, said outer and inner rings of pole teeth defining a cylindrical air gap therebetween, lag means mounted on said outer front stator disk in spaced relation from said inner front stator disk for creating a revolving field component in said gap, and a rotor comprising a hysteresis cylinder portion revolving in said cylindrical air gap.

2. In a self-starting single phase synchronous motor, the combination of a core, a winding mounted thereon, an outer stator ring mounted on the rear end of said core, inner and outer front stator disks mounted on the front end of said core, an outer circular ring of pole teeth projecting from said outer stator ring, an inner circular ring of pole teeth comprising forwardly facing pole teeth and rearwardly facing pole teeth projecting alternately from said inner and outer front stator disks respectively, said inner and outer rings of pole teeth defining a cylindrical air gap therebetween, magnetic spacing means between said inner and outer front stator disks, lag means mounted on one of said front stator disks for creating a revolving field component in said gap, and a rotor comprising a cup-shaped hysteresis portion revolving in said air gap.

3. In a self-starting single phase synchronous motor, the combination of a core, a winding mounted thereon, an outer stator ring mounted on the rear end of said core, inner and outer front stator disks mounted on the front end of said core, an outer circular ring of pole teeth projecting from said outer stator ring, an inner circular ring of pole teeth projecting forwardly from said inner front stator disk, an inner circular ring of pole teeth projecting rearwardly from said outer front stator disk, magnetic spacing means spacing the web portions of said front stator disks a distance substantially equal to the longitudinal dimensions of the pole teeth on said front stator disks, said outer and inner rings of pole teeth defining a cylindrical air gap therebetween, lag means mounted on one of said front stator disks for creating a revolving field component in said gap, and a rotor comprising a hysteresis cylinder portion revolving in said cylindrical air gap.

4. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, circular rings of pole teeth projecting from said inner and outer front stator disks, two of said rings of pole teeth being in concentric radially spaced relation to define a substantially cylindrical air gap therebetween, a lag disk mounted on the inner side of said outer front stator disk spaced from said inner front stator disk to lag the flux emanating from the pole teeth of that disk, such latter pole teeth having an angle of lead with respect to the pole teeth on the other front stator disks, and a hysteresis rotor comprising a cup-shaped portion revolving in said cylindrical air gap.

5. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, circular rings of pole teeth projecting forwardly and rearwardly respectively from said inner and outer front stator disks with the forwardly and rearwardly projecting portions of adjacent teeth extending in substantially parallel side-by-side relation, two of said rings of pole teeth being in concentric radially spaced relation to define a substantially cylindrical air gap therebetween, lag means mounted on one of said front stator disks between said disks and spaced from the other disk to create a revolving field component in said gap, the angular spacing center-to-center between the pole teeth on the inner front stator disk and the pole teeth on the outer front stator disk being approximately 17 degrees, and a hysteresis rotor comprising a cylinder portion revolving in said cylindrical air gap.

6. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, circular rings of pole teeth projecting forwardly and rearwardly respectively from said inner and outer front stator disks with the forwardly and rearwardly projecting portions of adjacent teeth extending in substantially parallel relation, two of said rings of pole teeth being in concentric radially spaced relation to define a substantially cylindrical air gap therebetween, shading means mounted on one of said front stator disks at a point between said disks and spaced from the other disk to shade the flux emanating from the pole teeth of that disk upon which the shading means is mounted, the angular spacing between the centers of said shaded pole teeth and the centers of the pole teeth on said stator ring being approximately twelve degrees, and a hysteresis rotor comprising a cylinder portion revolving in said cylindrical air gap.

7. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, circular rings of pole teeth projecting forwardly and rearwardly respectively from said inner and outer front stator disks with the tip ends of said forwardly and rearwardly projecting teeth facing in opposite directions, two of said rings of pole teeth being in concentric radially spaced relation to define a substantially cylindrical air gap therebetween, shading means mounted on one of said front stator disks at a point between said disks and spaced from the other disk to shade the flux emanating from the pole teeth of that disk upon which said shading means is mounted, said shaded pole teeth angularly overlapping the teeth on said stator ring by approximately three degrees, and a hysteresis rotor comprising a cylindrical portion revolving in said cylindrical air gap.

8. In a self-starting single phase synchronous motor, the combination of a core, a winding mounted thereon, a stator ring mounted on the rear end of said core, inner and outer front stator disks mounted on the front end of said core, an outer circular ring of pole teeth projecting from said stator ring, a circular ring of pole teeth projecting from said inner stator disk having substantially the same radius as said outer circular ring of pole teeth, and intermeshed therewith, an inner circular ring of pole teeth projecting from said outer front stator disk, said outer and inner rings of pole teeth defining a cylindrical air gap therebetween, lag means associated with one of said front stator disks for creating a revolving field component in said air gap, and a rotor comprising a cylindrical portion revolving in said cylindrical air gap.

9. In a self-starting single phase synchronous motor, the combination of a core, a winding mounted thereon, an outer stator ring mounted on the rear end of said core, inner and outer front stator disks mounted on the front end of said core, a forwardly facing circular ring of pole teeth projecting forwardly from said inner front stator disk, a rearwardly facing circular ring of pole teeth projecting rearwardly from said outer front stator disk, said forwardly and rearwardly facing rings of pole teeth being of substantially the same radius and being in intermeshing relation, an outer circular ring of pole teeth projecting from said outer stator ring and overlying said forwardly and rearwardly facing pole teeth, said outer ring of pole teeth being spaced from said forwardly and rearwardly facing rings of teeth to define a substantially cylindrical air gap therebetween, and a rotor comprising a cylindrical portion revolving in said cylindrical air gap.

10. In a self-starting single phase synchronous motor, the combination of a stator comprising a core, a winding mounted thereon, a stator ring mounted on the rear end of said core, inner and outer front stator disks mounted on the front end of said core, a circular ring of pole teeth projecting from said stator ring, circular rings of pole teeth projecting forwardly and rearwardly respectively from said inner and outer front stator disks with the tip ends of said forwardly and rearwardly projecting teeth facing in opposite directions, magnetic spacing means spacing said inner and outer front stator disks a distance apart substantially equal to the axial length of said latter pole teeth, two of said rings of pole teeth being in concentric radially spaced relation to define a substantially cylindrical air gap therebetween, lag means mounted on one of said front stator disks to create a revolving field component in said gap, the angular spacing center-to-center between the pole teeth on the inner front stator disk and the pole teeth on the outer front stator disk being approximately $$\frac{136}{P}$$

degrees where P equals the number of pole pairs on the stator, and a hysteresis rotor comprising a cylinder portion revolving in said cylindrical air gap.

11. In a self-starting single phase synchronous motor, the combination of a stator comprising a core, a winding mounted thereon, a stator ring mounted on the rear end of said core, inner and outer front stator disks mounted on the front end of said core, a circular ring of unshaded pole teeth projecting from said stator ring, circular rings of pole teeth projecting from said inner and outer front stator disks, two of said rings of pole teeth being in concentric radially spaced relation to define a substantially cylindrical air gap therebetween, shading means mounted on one of said front stator disks to shade the flux emanating from the pole teeth of that disk, the angular spacing between the centers of said shaded pole teeth and the centers of the unshaded pole teeth on said stator ring being approximately $$\frac{96}{P}$$

degrees where P equals the number of pole pairs on the stator, and a hysteresis rotor comprising a cylinder portion revolving in said cylindrical air gap.

12. In a self-starting synchronous single phase motor, the combination of a stator comprising a core, a winding mounted thereon, a stator ring mounted on the rear end of said core, inner and outer front stator disks mounted on the front end of said core, a circular ring of unshaded pole teeth projecting from said stator ring, circular rings of pole teeth projecting forwardly and rearwardly respectively from said inner and outer front stator disks, magnetic spacing means spacing said inner and outer front stator disks a distance substantially equal to the axial length of said latter pole teeth, two of said rings of pole teeth being in concentric radially spaced relation to define a substantially cylindrical air gap therebetween, shading means mounted on one of said front stator disks to shade the flux emanating from the pole teeth of that disk, said shaded pole teeth angularly overlapping the teeth on said stator ring by approximately $$\frac{24}{P}$$

degrees where P equals the number of pole pairs on said stator, and a hysteresis rotor comprising a cylindrical portion revolving in said cylindrical air gap.

13. In a self-starting single phase synchronous motor, the combination of a core, a winding mounted thereon, an outer stator ring mounted on the rear end of said core, inner and outer front stator disks mounted on the front end of said core, a forwardly facing circular ring of pole teeth projecting forwardly from said inner front stator disk, a rearwardly facing circular ring of pole teeth projecting rearwardly from said outer front stator disk, said forwardly and rearwardly facing rings of pole teeth being of substantially the same radius and being in intermeshing relation, magnetic spacing means spacing the web portions of said front stator disks a distance substantially equal to the longitudinal dimensions of the pole teeth on said front stator disks, an outer circular ring of pole teeth projecting from said outer stator ring and overlying said forwardly and rearwardly facing pole teeth, said outer ring of pole teeth being spaced from said forwardly and rearwardly facing rings of teeth to define a substantially cylindrical air gap therebetween, and a rotor comprising a cylindrical portion revolving in said cylindrical air gap.

14. In a self-starting single phase synchronous motor, the combination of a core, a winding mounted thereon, an outer stator ring mounted on the rear end of said core, inner and outer front stator disks mounted on the front end of said core, a forwardly facing circular ring of pole teeth projecting forwardly from said inner front stator disk, a rearwardly facing circular ring of pole teeth projecting rearwardly from said outer front stator disk, said forwardly and rearwardly facing rings of pole teeth being of substantially the same radius and being in intermeshing substantially parallel relation, magnetic spacing means spacing said inner and outer front stator disks a distance apart substantially equal to the axial lengths of said latter pole teeth, an outer circular ring of pole teeth projecting from said outer stator ring and overlying said forwardly and rearwardly facing pole teeth, said outer ring of pole teeth being spaced from said forwardly and rearwardly facing rings of teeth to define a substantially cylindrical air gap therebetween, lag means mounted on one of said front stator disks for creating a revolving field component in said air gap, and a rotor comprising a cylindrical portion revolving in said cylindrical air gap.

15. In a self-starting single phase synchronous motor, the combination of a core, a winding mounted thereon, an outer stator ring mounted on the rear end of said core, inner and outer front stator disks mounted on the front end of said core, a forwardly facing circular ring of pole teeth projecting forwardly from said inner front stator disk, a rearwardly facing circular ring of pole teeth projecting rearwardly from said front stator disk, said forwardly and rearwardly facing rings of pole teeth being of substantially the same radius and being in intermeshing relation, magnetic spacing means spacing the web portions of said front stator disks a distance apart substantially equal to the longitudinal dimensions of the pole teeth on said front stator disks, an outer circular ring of pole teeth projecting from said outer stator ring and overlying said forwardly and rearwardly facing pole teeth, said outer ring of pole teeth being spaced from said forwardly and rearwardly facing rings of teeth to define a substantially cylindrical air gap therebetween, lag means mounted on one of said front stator disks for creating a revolving field component in said gap, and a rotor comprising a cylindrical portion revolving in said cylindrical air gap.

16. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, a forwardly facing circular ring of pole teeth projecting from said inner front stator disk, a rearwardly facing circular ring of pole teeth projecting from said outer front stator disk, magnetic spacing means spacing said inner and outer front stator disks a distance apart substantially equal to the length of the pole teeth projecting from said disks, two of said rings of pole teeth being in concentric radially spaced relation to define a substantially cylindrical air gap therebetween, and a hysteresis rotor comprising a substantially cylindrical portion revolving in said substantially cylindrical air gap.

17. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, a forwardly facing circular ring of pole teeth projecting from said inner front stator disk, a rearwardly facing circular ring of pole teeth projecting from said outer front stator disk, two of said rings of pole teeth being in concentric radially spaced relation to defint a substantially cylindrical air gap therebetween, magnetic spacing means spacing the web portions of said front stator disks a distance substantially equal to the longitudinal dimensions of the pole teeth on said front stator disks, and a rotor comprising a substantially cylindrical portion revolving in said cylindrical air gap.

18. In a self-starting single phase synchronous motor, the combination of a core, a winding mounted thereon, a stator ring mounted on the rear end of said core, inner and outer front stator disks mounted on the front end of said core, a circular ring of pole teeth projecting from said stator ring, a forwardly facing circular ring of pole teeth projecting from said inner front stator disk, a rearwardly facing circular ring of pole teeth projecting from said outer front stator disk, magnetic spacing means spacing said inner and outer front stator disks a distance apart substantially equal to the length of the pole teeth projecting from said disks, two of said rings of pole teeth being in concentric radially spaced relation to define a substantially cylindrical air gap therebetween, lag means mounted on one of said front stator disks for creating a revolving field component in said air gap, and a rotor comprising a cylindrical portion revolving in said substantially cylindrical air gap.

19. In a self-starting single phase synchronous motor, the combination of a core, a winding mounted thereon, an outer stator ring mounted on the rear end of said core, inner and outer front stator disks mounted on the front end of said core, a forwardly facing circular ring of pole teeth projecting from said stator ring, a forwardly facing circular ring of pole teeth projecting forwardly from said inner front stator disk, a rearwardly facing circular ring of pole teeth projecting rearwardly from said outer front stator disk, magnetic spacing means spacing the web portions of said front stator disks a distance apart substantially equal to the longitudinal dimensions of the pole teeth on said front stator disks, two of said rings of pole teeth being in concentric radially spaced relation to define a substantially cylindrical air gap therebetween, lag means mounted on one of said front stator disks for creating a revolving field component in said gap, and rotor comprising a cylindrical portion revolving in said cylindrical air gap.

20. In a self-starting single phase synchronous motor, the combination of a core, a winding mounted thereon, an outer stator ring mounted on the rear end of said core, a circular ring of pole teeth projecting from said stator ring, inner and outer front stator disks mounted on the front end of said core, circular rings of pole teeth projecting from each of said stator disks, one of said latter rings of stator disk teeth extending substantially longitudinally of the stator, magnetic spacing means spacing the web portions of said inner and outer stator disks a distance apart substantially equal to the longitudinal dimension of said latter ring of longitudinally extending stator disk teeth, two of said rings of pole teeth being in concentric radially spaced relation to define a substantially cylindrical air gap therebetween, and a rotor comprising a cylindrical portion revolving in said air gap.

21. In a self-starting single phase synchronous motor, the combination of a core, a winding mounted thereon, an outer stator ring mounted on the rear end of said core, a circular ring of pole teeth projecting from said stator ring, inner and outer front stator disks mounted on the front end of said core, circular rings of pole teeth projecting from each of said stator disks, one of said latter rings of stator disk teeth extending substantially longitudinally of the stator, magnetic spacing means spacing the web portions of said inner and outer stator disks a distance apart substantially equal to the longitudinal dimension of said latter ring of longitudinally extending stator disk teeth, two of said rings of pole teeth being in concentric radially spaced relation to define a substantially cylindrical air gap therebetween, lag means mounted on one of said front stator disks for creating a revolving field component in said gap, and a rotor comprising a cylindrical portion revolving in said gap.

22. In a self-starting single phase synchronous motor, the combination of a core, a winding mounted thereon, an outer stator ring mounted on the rear end of said core, an outer ring of pole teeth projecting from said stator ring, inner and outer front stator disks mounted on the front end of said core, an inner ring of pole teeth projecting from said inner front stator disk, an inner ring of pole teeth projecting from said outer front stator disk, said outer and inner rings of pole teeth defining a cylindrical air gap therebetween, lag means mounted to lag one of said stator disks to create a revolving field component in said gap, the outer radial dimension of the ring of pole teeth on the lagged stator disk being greater than the outer radial dimension of the ring of pole teeth on the unlagged stator disk, and a rotor comprising a cylindrical portion revolving in said cylindrical air gap.

23. In a self-starting single phase synchronous motor, the combination of a core, a winding mounted thereon, an outer stator ring mounted on the rear end of said core, an outer ring of pole teeth projecting from said stator ring, inner and outer front stator disks mounted on the front end of said core, an inner ring of pole teeth projecting from said inner front stator disk, an inner ring of pole teeth projecting from said outer front stator disk, said outer and inner rings of pole teeth defining a cylindrical air gap therebetween, lag means mounted on one of said stator disks to create a revolving field component in said air gap, the pole teeth on the lagged stator disk being of greater radial dimension and of greater angular width than the pole teeth on the unlagged stator disk in order to make the lagging flux in the lagged disk substantially equal to the flux in the unlagged disk, and a rotor comprising a cylindrical portion revolving in said cylindrical air gap.

24. In a self-starting single phase synchronous motor, the combination of a core, a winding mounted thereon, a stator ring mounted on the rear end of said core, inner and outer front stator disks mounted on the front end of said core, a circular ring of unshaded pole teeth projecting from said stator ring, a forwardly facing circular ring of pole teeth projecting from said inner front stator disk, a rearwardly facing circular ring of pole teeth projecting from said outer front stator disk, the forwardly facing and rearwardly facing portions of said latter teeth extending in substantially parallel side-by-side relation, magnetic spacing means spacing said inner and outer front stator disks a distance apart substantially equal to the length of the pole teeth projecting from said disks, two of said rings of pole teeth being in concentric radially spaced relation to define a substantially cylindrical air gap therebetween, lag means mounted on one of said front stator disks for creating a revolving field component in said air gap, and a rotor comprising a cylindrical portion revolving in said substantially cylindrical air gap.

25. In a self-starting single phase synchronous motor, the combination of a core, a winding mounted thereon, an outer stator ring mounted on the rear end of said core, inner and outer front stator disks mounted on the front end of said core in axially spaced relation, an outer circular ring of pole teeth projecting from said outer stator ring, an inner circular ring of pole teeth projecting alternately from said inner and outer stator disks, said outer and inner rings of pole teeth defining a cylindrical air gap therebetween, lag means mounted on one of said front stator disks in spaced relation from the other of said front stator disks for creating a revolving field component in said gap, and a rotor comprising a cylindrical portion revolving in said cylindrical air gap.

FRED KURZ.

REFERENCES CITED

The following references are of record in the file of this patent:

UNITED STATES PATENTS

| Number | Name | Date |
|---|---|---|
| 1,747,870 | Holtz | Feb. 18, 1930 |
| 2,070,447 | Morrill | Feb. 9, 1937 |
| 2,080,371 | Hammond | May 11, 1937 |
| 2,234,420 | Traeger | Mar. 11, 1941 |
| 2,292,265 | Carpenter | Aug. 4, 1942 |
| 2,305,963 | Hansen et al. | Dec. 22, 1942 |
| 2,374,347 | Hansen et al. | Apr. 24, 1945 |
| 2,460,358 | Packard | Feb. 1, 1949 |
| 2,537,093 | Schlenker et al. | Jan. 9, 1951 |